United States Patent
Naitou et al.

(10) Patent No.: US 6,888,135 B2
(45) Date of Patent: May 3, 2005

(54) SCANNING PROBE MICROSCOPE WITH PROBE FORMED BY SINGLE CONDUCTIVE MATERIAL

(75) Inventors: Yuichi Naitou, Tokyo (JP); Norio Ookubo, Tokyo (JP)

(73) Assignee: NEC Corporation, Tokyo (JP)

( * ) Notice: Subject to any disclaimer, the term of this patent is extended or adjusted under 35 U.S.C. 154(b) by 104 days.

(21) Appl. No.: 09/981,390

(22) Filed: Oct. 18, 2001

(65) Prior Publication Data

US 2002/0043101 A1 Apr. 18, 2002

(30) Foreign Application Priority Data

Oct. 18, 2000 (JP) .......................................... 2000-317368

(51) Int. Cl.[7] ................................................ G01B 5/28
(52) U.S. Cl. ..................................... 250/306; 250/201.3
(58) Field of Search .............................. 250/306, 201.3; 324/458

(56) References Cited

U.S. PATENT DOCUMENTS 5,990,477 A * 11/1999 Tomita ....................... 250/306
6,172,506 B1 * 1/2001 Adderton et al. ........... 324/458
6,210,982 B1 * 4/2001 Williams et al. .............. 438/14
6,257,053 B1 * 7/2001 Tomita et al. ................ 73/105

FOREIGN PATENT DOCUMENTS

| JP | 04-238203 | 8/1992 |
| JP | 07-229908 | 8/1995 |
| JP | A 8-54403 | 2/1996 |
| JP | 08-248043 | 9/1996 |
| JP | 09-329606 | 12/1997 |
| JP | 10-064965 | 3/1998 |
| JP | 10-082790 | 3/1998 |
| JP | 10-282121 | 10/1998 |
| JP | 11-038029 | 2/1999 |
| JP | 2000-065716 | 3/2000 |

* cited by examiner

Primary Examiner—John R. Lee
Assistant Examiner—Phillip A Johnston
(74) Attorney, Agent, or Firm—Young & Thompson

(57) ABSTRACT

In a scanning probe microscope a probe associated with its sharp end includes a single conductive material.

61 Claims, 10 Drawing Sheets

Z IMAGE dC/dV IMAGE

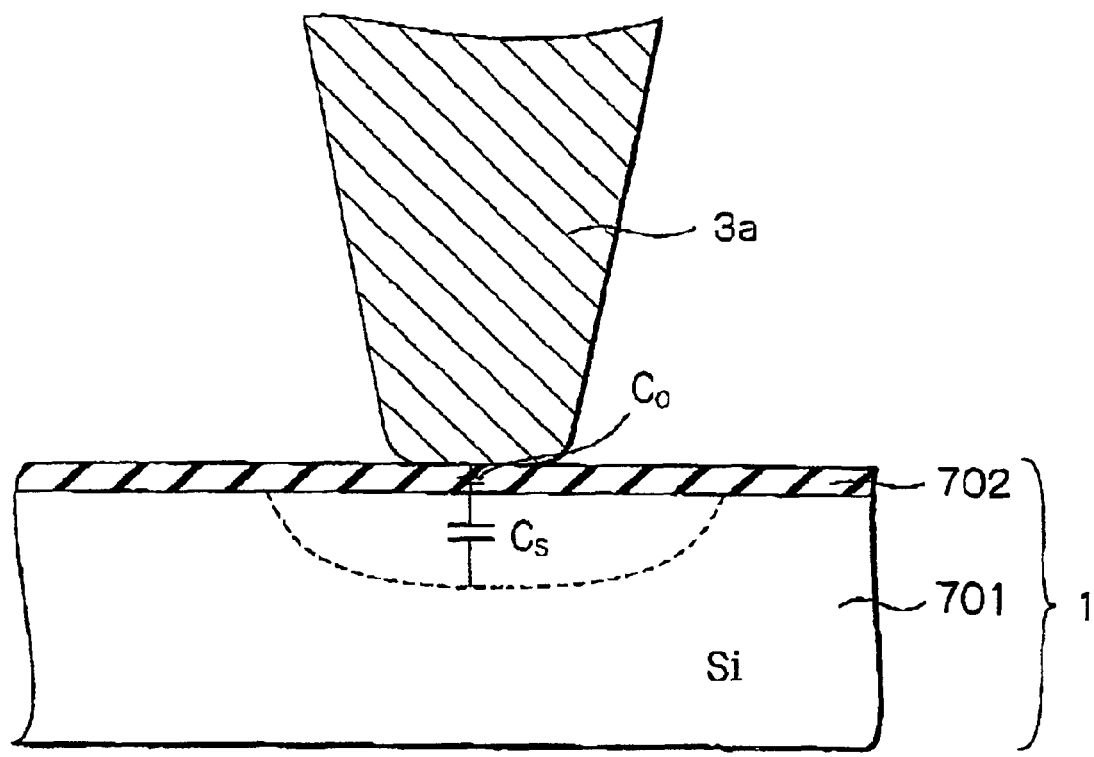

SCANNING PROBE MICROSCOPE WITH PROBE FORMED BY SINGLE CONDUCTIVE MATERIAL

BACKGROUND OF THE INVENTION

1. Field of the Invention

The present invention relates to a scanning probe microscope such as a scanning capacitance microscope (ScaM).

2. Description of the Related Art

A prior art scanning probe microscope includes a conductive probe unit which is constructed by a cantilever and a probe at its free end (see: JP-A-8-54403). The cantilever is adapted to be approximately in parallel with a surface of a sample, and the probe is in proximity to the surface of the sample. In this case, the cantilever associated with the probe is made of monocrystalline silicon covered by silicon oxide or silicon nitride and metal coated on the monocrystalline silicon. Thus, the cantilever serves as a spring. This will be explained later in detail.

In the above-described prior art scanning probe microscope, however, since the coated metal of the cantilever is so thin that the coated metal has a high impedance, i.e., a low conductivity, the sensitivity of a sensor connected to the probe is substantially decreased. Also, since the coated metal of the cantilever has a larger surface to create a large stray capacitance between the cantilever and the sample, a signal generated from the probe is suppressed by the large stray capacitance. Further, since the radius of curvature of the tip portion of the probe is large, the spatial resolution cannot be increased. In order to increase the spatial resolution, the coated metal has to be made thinner to decrease the radius of curvature of the tip portion thereof; however, this further increases the impedance of the coated metal. In addition, the coated metal is easily peeled off by the friction between the coated metal and the sample. Further, Joule heat generated stays at the tip portion of the probe to dissolve the coated metal at the tip portion of the probe. Thus, the conductivity of the coated metal is decreased.

SUMMARY OF THE INVENTION

It is an object of the present invention to provide a scanning probe microscope constructed by a conductive probe capable of having a low impedance, a small stray capacitance, a small radius of curvature at the tip portion thereof, and preventing the tip portion from being peeled off and dissolved.

Another object is to provide a scanning probe microscope capable of simply obtaining a concentration of majority carriers in equilibrium or a concentration of duponts in a semiconductor device.

Still another object is to provide a conductive probe for use in the above-mentioned scanning probe microscope.

According to the present invention, a probe for use in a scanning probe microscope includes a single conductive material having a sharp end. Also, a scanning probe microscope for a sample is constructed by a probe having a conductive sharp end; a moving unit for moving the sample along a Z-direction and moving the sample in X- and Y-directions; a vibrating unit for vibrating the probe along a direction approximately in parallel with a surface of the sample; a vibration detecting unit for detecting a vibration state of the probe; a signal detecting unit for detecting an electrical characteristic signal between the probe and the sample; a control unit for controlling an interaction between the probe and the sample so that the interaction is brought close to a predetermined definite level; and a voltage applying unit for applying an AC/DC voltage to the sample.

BRIEF DESCRIPTION OF THE DRAWINGS

The present invention will be more clearly understood from the description set forth below, as compared with the prior art, with reference to the accompanying drawings, wherein:

FIG. 7 is a cross-sectional view of the sample of FIG. 4;

DESCRIPTION OF THE PREFERRED EMBODIMENTS

Before the description of the preferred embodiments, a prior art scanning probe microscope will be explained with reference to FIGS. 1, 2A and 2B (see: JP-A-8-54403).

Figure 1:
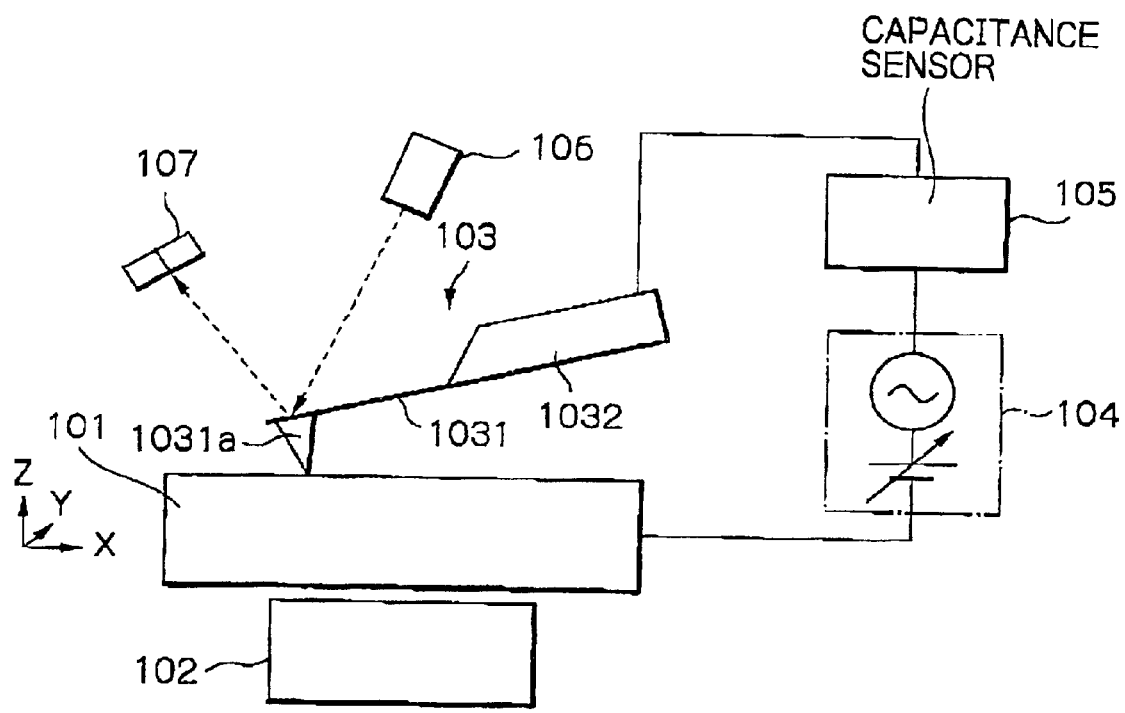
FIG. 1 is a diagram illustrating a prior art scanning probe microscope.

In FIG. 1, which illustrates a prior art scanning probe microscope combined by an atomic force microscope and a scanning capacitance microscope, a sample 101 such as a semiconductor device is mounted on a piezoelectric element 102, so that the sample 101 can be moved along X-, Y- and Z-directions by the piezoelectric element 102. A conductive probe unit 103 is in proximity to the surface of the sample 101, and an AC/DC modulation voltage is applied by a voltage modulation circuit 104 connected between the sample 101 and the conductive probe unit 103. Also, a capacitance sensor 105 is connected between the conductive probe unit 103 and the voltage modulation circuit 104. The capacitance sensor 105 is constructed by an LC resonance circuit, an oscillation circuit and a detector including a diode. Further, a laser diode 106 irradiates the conductive probe unit 103 with light beams, and a detector 107 detects light beams reflected therefrom, thus detecting a displacement of the conductive probe unit 103.

Figure 2A:
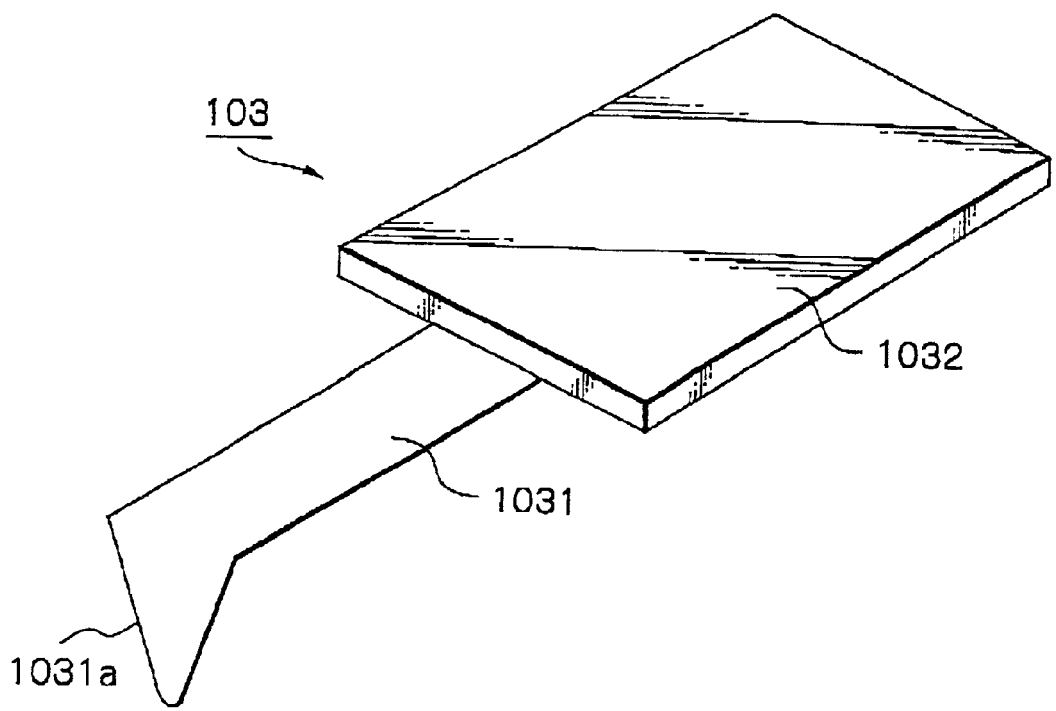
FIG. 2A is a perspective view of the conductive probe unit of FIG. 1.

As illustrated in FIG. 2A, which is a perspective view of the conductive probe unit 103 of FIG. 1, the conductive probe unit 103 is constructed by a cantilever 1031 having a sharp probe 1031a at its free end and a holder 1032 for holding the cantilever 1031.

Figure 2B:
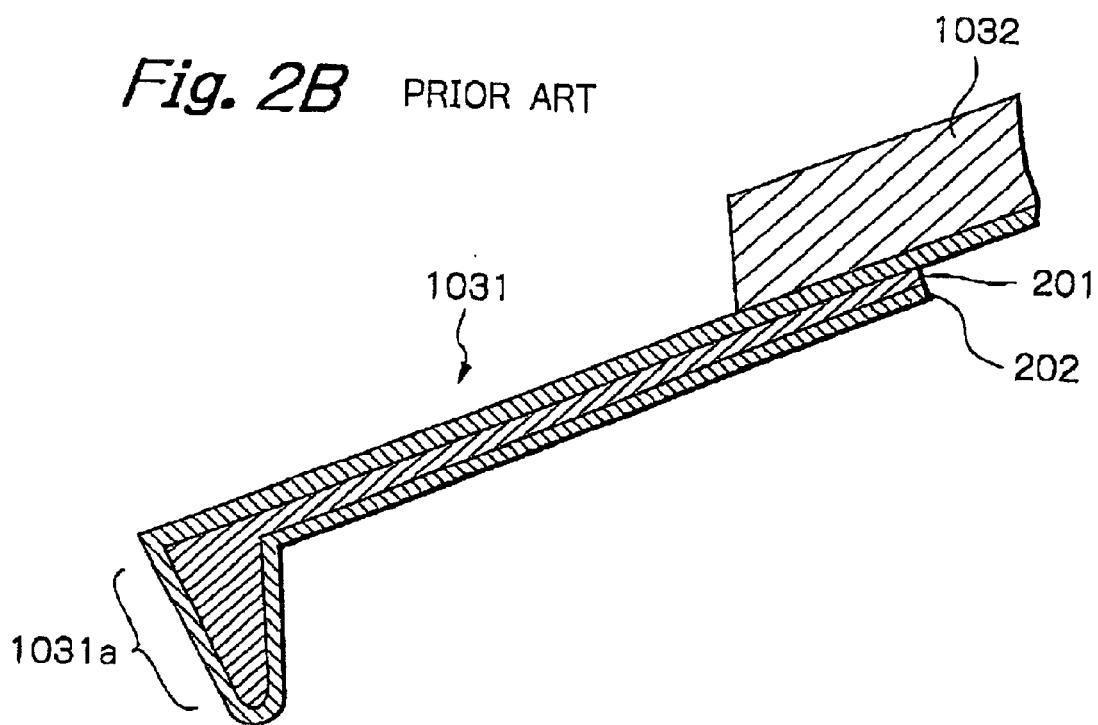
FIG. 2B is a cross-sectional view of the conductive probe of FIG. 1.

As illustrated in FIG. 2B, which is a cross-sectional view of the conductive probe unit 103 of FIG. 1, the cantilever 1031 associated with the probe 1031a is constructed by a monocrystalline silicon substrate 201 covered by silicon oxide or silicon nitride (not shown) and an about 100 nm thick metal layer 202 made of Au, Pt/Ir or Co/Cr coated on the monocrystalline silicon substrate 201. Thus, the cantilever 1031 serves as a spring.

In the scanning probe microscope of FIGS. 1, 2A and 2B, the detector 107 detects the displacement of the conductive probe unit 103, i.e., the displacement of the cantilever 1031 by detecting light beams reflected from the cantilever 1031, so that a contact pressure of the probe 1031a to the sample 101 is detected. On the other hand, the distance in the Z-direction between the sample 101 and the probe 1031a is controlled by the piezoelectric element 102, so that the contact pressure of the probe 1031a to the sample 101 is brought close to a definite value. Additionally, information regarding a capacitance between the sample 101 and the probe 1031a is detected by the capacitance sensor 105. As a result, two-dimensional surface information of the sample 101 as well as two-dimensional capacitance information of the sample 101 can be obtained.

In the scanning probe microscope of FIGS. 1, 2A and 2B, however, since the metal layer 202 is so thin that the metal layer 202 has a high impedance, i.e., a low conductivity, the sensitivity of the capacitance sensor 105 is substantially decreased.

Also, since the cantilever 1031 has a larger surface of the metal layer 202 than that of the metal layer 202 of the probe 1031a to create a large stray capacitance between the cantilever 1031 and the sample 101, a capacitance signal generated from the probe 1031a is suppressed by the large stray capacitance. Thus, the signal to noise (S/N) ratio of the capacitance signal of the capacitance sensor 105 is deteriorated.

Further, since the radius of curvature of the tip portion of the probe 1031a is large, the spatial resolution cannot be increased. In order to increase the spatial resolution, the metal layer 202 has to be made thinner to decrease the radius of curvature of the tip portion thereof; however, this further increases the impedance of the metal layer 202.

In addition, since the metal layer 202 is coated on the monocrystalline silicon substrate 201, the metal layer 202 is easily peeled off by the friction between the metal layer 202 and the sample 101.

Further, when a DC current flows between the probe 1031a and the sample 101, Joule heat is generated and stays at the tip portion of the probe 1031a to dissolve the metal layer 202 at the tip portion of the probe 1031a. Thus, the conductivity of the metal layer 202 is decreased.

Figure 3:
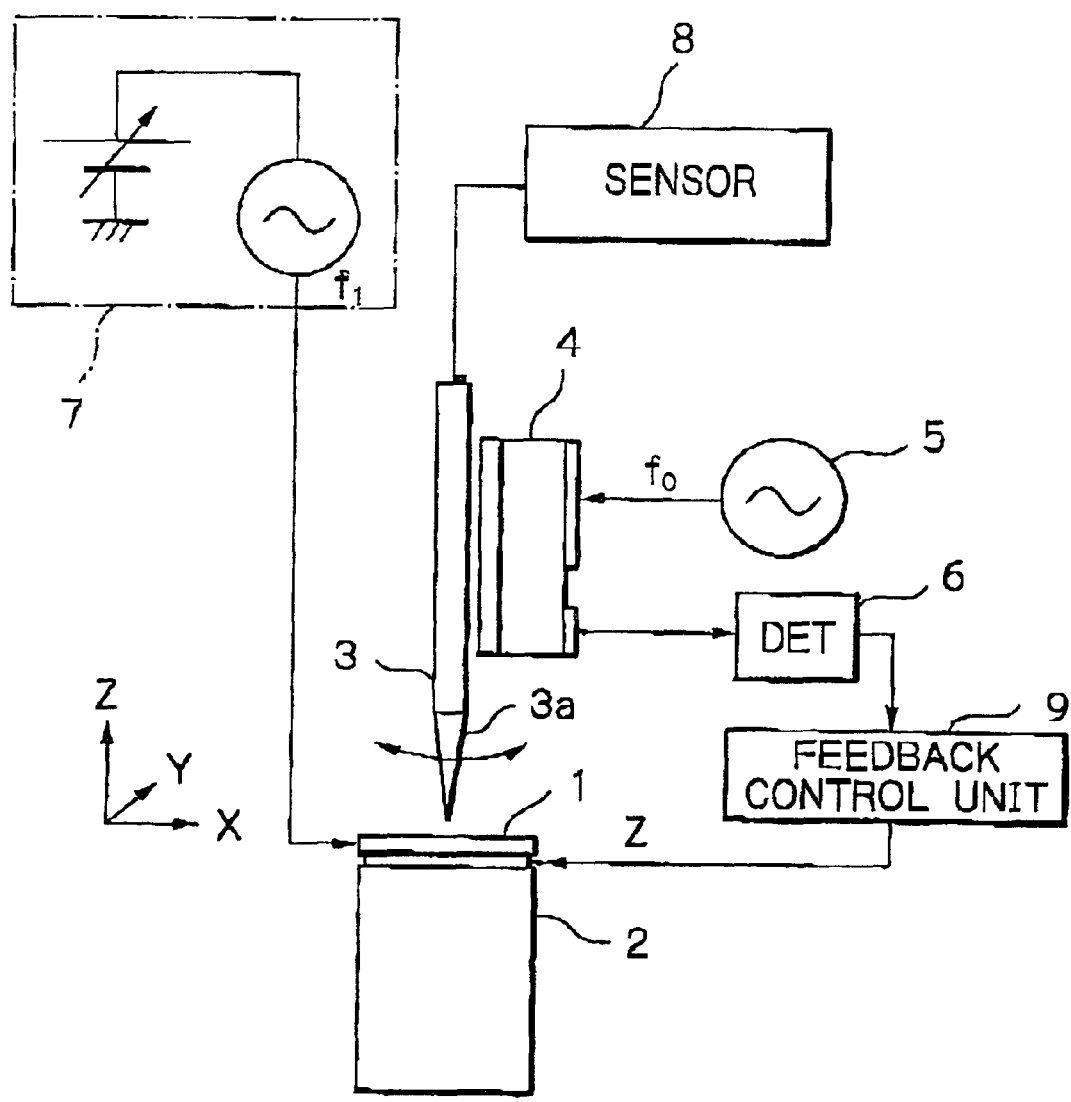
FIG. 3 is a diagram illustrating a principle of the scanning probe microscope according to the present invention.

In FIG. 3, which illustrates a principle of the scanning probe microscope according to the present invention, a sample 1 such as a semiconductor device is mounted on a piezoelectric element 2, so that the sample 1 can be moved along X-, Y- and Z-directions by the piezoelectric element 2.

A conductive probe 3 is provided to be in proximity to the surface of the sample 1, The conductive probe 3 is constructed by about 20 to 100 μm-diameter metal wire made of W, Pt/Ir, Ni, Au or Ag and has a sharp end 3a. The sharp end 3a is formed by performing an electropolishing process upon the metal wire. In this case, the radius of curvature of the sharp end 3a is adjusted by the concentration of electrolysis, the applied voltage or the time period during which the metal wire is immersed into the electrolysis, so that the radius of curvature of the sharp end 3a is reproducibly realized. Note that an electrical discharge machining process can be used instead of the electropolishing process.

The conductive probe 3 is vibrated along the X-direction by a piezoelectric element 4 which is driven by an oscillator 5 whose frequency $f_0$ is 30 to 60 kHz. In this case, the piezoelectric element 4 is electrically isolated from the conductive probe 3. When the conductive probe 3 is vibrated by the piezoelectric element 4, the conductive probe 3 is vibrated approximately at a resonant state thereof. Simultaneously, the conductive probe 3 generates a current signal due to the piezoelectric effect of the piezoelectric element 4 caused by the vibration of the conductive probe 3.

Also, a detector 6 is provided to detect the vibration state of the conductive probe 3, to generate a detection signal in response to the amplitude of the vibration of the conductive probe 3 or the difference in phase between the vibration frequency of the conductive probe 3 and the frequency $f_0$ of the oscillator 5. The detector 6 is preferably in proximity to the piezoelectric element 4 or within the piezoelectric element 4. In order to effectively induce a resonant state on the conductive probe 3, the mass of the conductive probe 3 is preferably equivalent to that of the piezoelectric element 4. Also, if the piezoelectric element 4 has a natural resonant frequency as in a crystal oscillator, the conductive probe 3 is vibrated at this natural resonant frequency. In this case, in order not to deteriorate the resonance characteristics of the piezoelectric element 4, the mass of the conductive probe 3 is preferably as small as possible. A feedback control unit 9 is provided to receive the detection signal of the detector 6 and control the location Z of the sample 1 in accordance with the output signal of the detector 6, so that the amplitude of the vibration of the conductive probe 3 or the difference in phase between the vibration frequency of the conductive probe 3 and the frequency $f_0$ of the oscillator 5 is brought close to a predetermined definite value. Thus, a feedback control using the detector 6 and the feedback control unit 9 is performed upon the distance between the sample 1 and the conductive probe 3.

Further, an AC voltage V whose frequency $f_1(>f_0)$ is 20 kHz to 10 MHz is applied by a voltage modulation circuit 7 to the sample 1. In this case, the frequencies $f_0$ and $f_1$ are preset so as not to interfere with each other. Note that the voltage modulation circuit 7 can apply a DC voltage to the sample 1.

Additionally, a sensor 8, which is a capacitance sensor or a current sensor, is connected to the conductive probe 3 to detect a capacitance between the conductive probe 3 and the sample 1 or a current flowing therethrough.

In the scanning probe microscope of FIG. 3, since the conductive probe 3 has a low impedance, i.e., a high conductivity, the sensitivity of the sensor 8 is substantially increased.

Also, since the conductive probe 3 has a small surface against the sample 1 to create only a small stray capacitance between the conductive probe 3 and the sample 1, a signal generated from the sharp end 3a is hardly suppressed by the small stray capacitance. Thus, the S/N ratio of the sensor signal is not deteriorated.

Further, since the radius of curvature of the sharp end 3a is small, the spatial resolution can be increased.

In addition, since the conductive probe 3 associated with the sharp edge 3a is made of a single material such as W, Pt/Ir Ni, Au or Ag the sharp edge 3a is hardly peeled off from the conductive probe 3 by the friction between the sharp edge 3a and the sample 1.

Further, when a DC current flows between the sharp edge 3a and the sample 1, Joule heat is generated; however, this heat is immediately transferred to the body of the conductive probe 3. As a result, the sharp edge 3a is hardly dissolved. Thus, the conductivity of the conductive probe 3 is not decreased.

Embodiments of the present invention to which the principle of FIG. 3 is applied will be explained next with reference to FIGS. 4, 5, 6A, 6B, 7, 8A and 8B.

Figure 4:
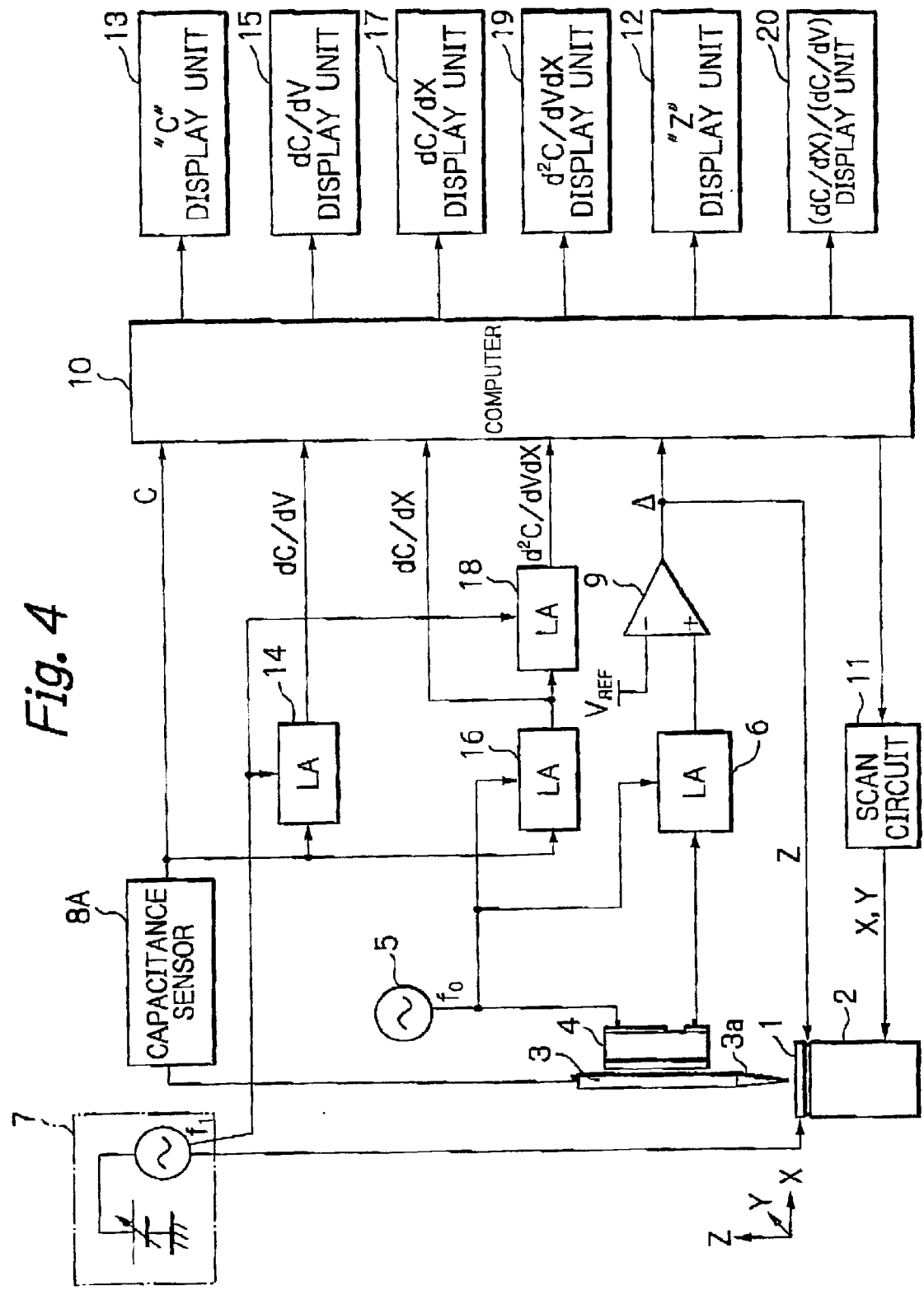
FIG. 4 is a block circuit diagram illustrating a first embodiment of the scanning probe microscope according to the present invention.

In FIG. 4, which illustrates a first embodiment of the scanning probe microscope according to the present invention, a capacitance sensor 8A serves as the sensor 8 of FIG. 3. Therefore, the scanning probe microscope of FIG. 4 is a scanning capacitance microscope.

In FIG. 4, the piezoelectric element 4 vibrates the conductive probe 3, and simultaneously, the piezoelectric element 4 generates a current signal due to the piezoelectric effect of the piezoelectric element 4 caused by the vibration of the conductive probe 3. A lock-in amplifier serving as the detector 6 of FIG. 3 detects the vibration amplitude of the conductive probe 3 or the difference in phase between the vibration frequency of the conductive probe 3 and the frequency $f_0$ of the oscillator 5 using the frequency $f_0$ of the oscillator 5 as a reference. Then, the output voltage of the lock-in amplifier 6 is supplied to an input of a servo circuit 9 which generates an output voltage Δ and transmits it to the-piezoelectric element 2. Note that the servo circuit 9 serves as the feedback control unit of FIG. 3. As a result, the location Z of the sample 1 is controlled by using the output voltage Δ of the servo circuit 9, so that the vibration amplitude of the conductive probe 3 or the difference in phase between the vibration frequency of the conductive probe 3 and the frequency $f_0$ of the oscillator 5 is brought close to a reference voltage $V_{REF}$. Thus, the distance between the sharp edge 3a of the conductive probe 3 and the sample 1 is brought close to a definite value.

In FIG. 4, since the vibration state of the conductive probe 3 is detected by the piezoelectric element 4, an optical system formed by the laser diode 106 and the detector 107 of FIG. 1 is unnecessary, and also, the sample 1, the conductive probe 3 and the like can be easily incorporated into a small vacuum chamber or cryostat.

Figure 6A:
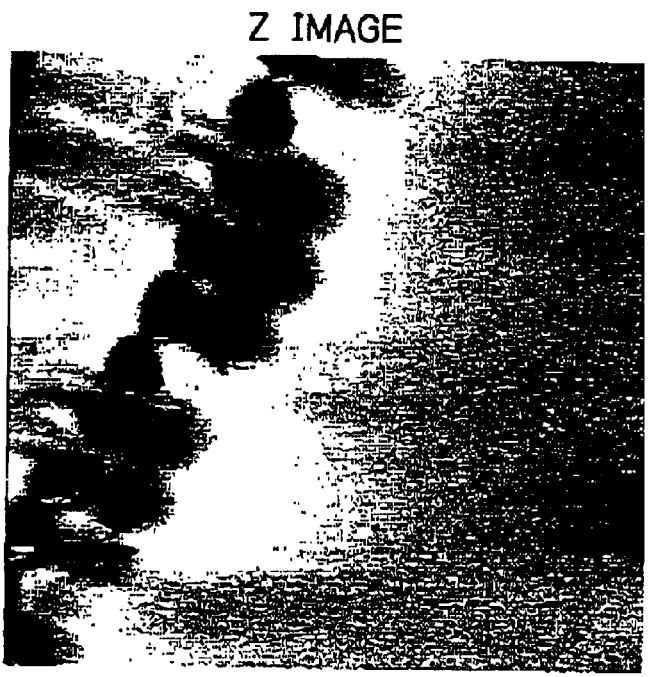
FIG. 6A is a diagram showing an image displayed on the "C" display unit of FIG. 4.

Also, a computer 10 is provided for controlling the entire scanning probe microscope of FIG. 4, and a scan circuit 11 is connected between the computer 10 and the piezoelectric element 2 to move the sample 1 along the X- and Y-directions. As a result, the conductive probe 3 scans the sample 1 while the distance between the conductive probe 3 and the sample 1 is maintained at a definite value. In this case, the computer 10 stores the location Z of the sample 1 corresponding to the output voltage Δ of the servo circuit 9 in relation to the location of the conductive probe 3 in the X- and Y-directions in a memory thereof. For example, the scan circuit 11 is operated so that a 4 μm×4 μm area of the sample 1 is scanned by the conductive probe 3. Thus, a topographical image of the sample 1 using the location Z is obtained by the computer 10 on a "Z" display unit 12 as shown in FIG. 6A.

Figure 5:
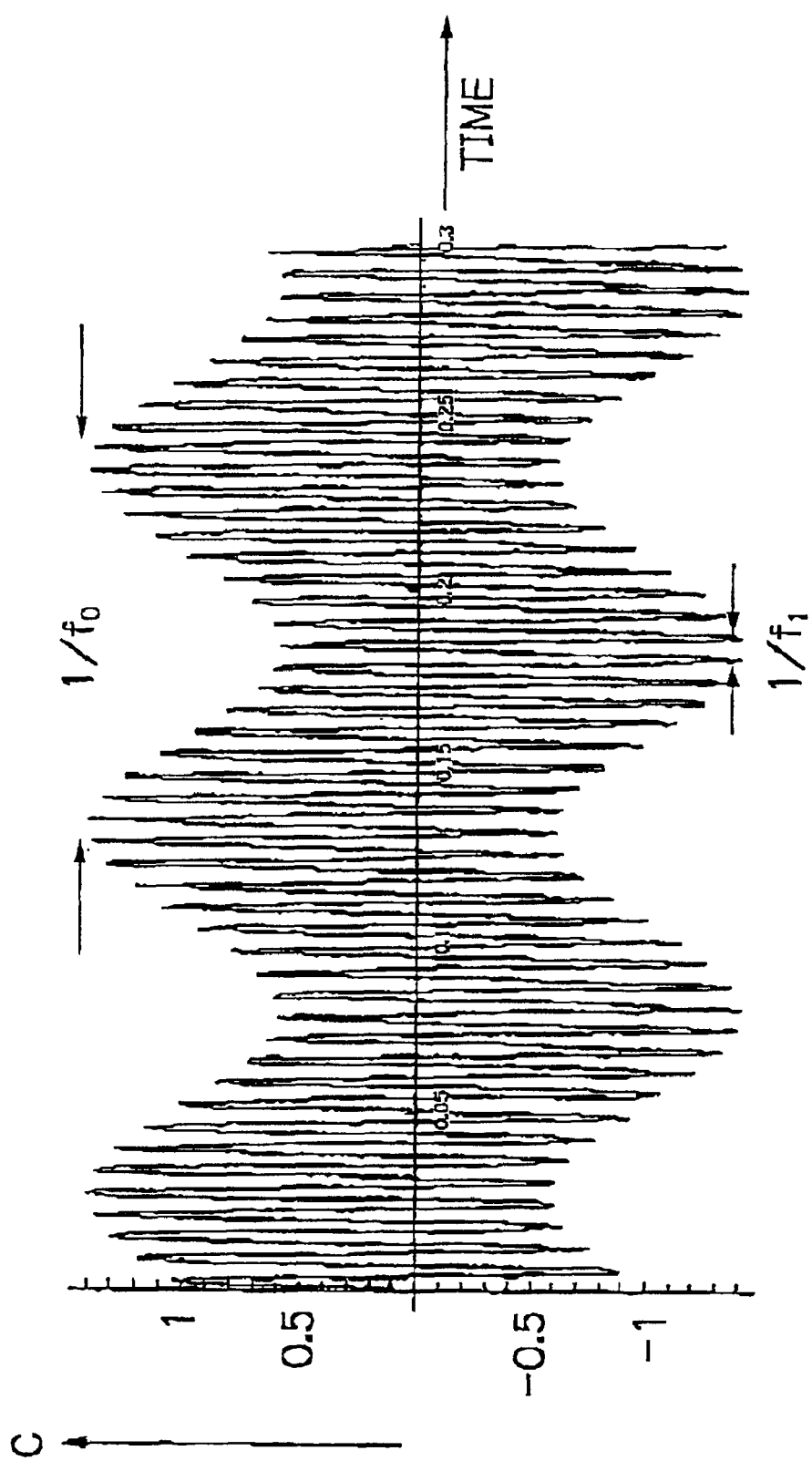
FIG. 5 is a timing diagram showing the capacitance signal of the capacitance sensor of FIG. 4.

The capacitance sensor 8A generates a capacitance signal C relating to a capacitance between the conductive probe 3 and the sample 1. For example, if the sample 1 is constructed by a semiconductor device, the capacitance sensor 8A generates a capacitance signal C as shown in FIG. 5 in dependency upon a depletion region generated in the semiconductor device immediately below the conductive probe 3. Thus, the capacitance signal C is stored in the memory of the computer 10 in relation to the relative location of the conductive probe 3 in the X- and Y-directions. As a result, the capacitance of the sample 1 using the capacitance signal C is obtained by the computer 10 on the "C" display unit 13.

Figure 6B:
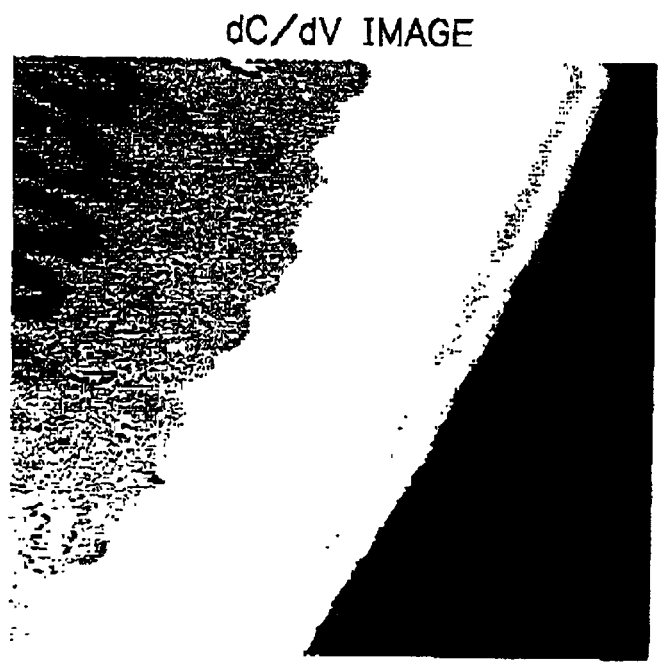
FIG. 6B is a diagram showing an image displayed on the dC/dV display unit of FIG. 4.

A lock-in amplifier 14 detects a dC/dV signal from the capacitance signal C of the capacitance sensor 8A using the frequency $f_1$ of the AC voltage of the voltage modulation circuit 7 as a reference, while a 4 μm×4 μm predetermined area of the sample 1 is scanned by the conductive probe 3 using the scan circuit 11. Thus, the dC/dV signal is stored in the memory of the computer 10 in relation to the relative location of the conductive probe 3 in the X- and Y-directions. As a result, a dC/dV image of the sample 1 is obtained by the computer 10 on a dC/dV display unit 15 as shown in FIG. 6B. In this case, if the sample 1 is a semiconductor device, the sign of the dC/dV signal indicates a polarity of dopants in a depletion region immediately below the conductive probe 3, and the absolute value of the dC/dV signal indicates the concentration of stationary charges in the above-mentioned depletion region.

As shown in FIG. 5, the capacitance signal C of the capacitance sensor 8A is modulated by the vibration frequency of the conductive probe 3. Therefore, a lock-in amplifier 16 is provided to detect a dC/dX signal from the capacitance signal C of the capacitance sensor 8A using the frequency $f_0$ of the oscillator 5 as a reference, while a 4 μm×4 μm predetermined area of the sample 1 is scanned by the scan circuit 11. In this case, the dC/dX signal indicates a spatial differential component of the capacitance C with respect to a coordinate X for showing the vibration direction of the conductive probe 3. Thus, the dC/dX signal is stored in the memory of the computer 10 in relation to the relative location of the conductive probe 3 in the X- and Y-directions. As a result, a dC/dX image of the sample 1 is obtained by the computer 10 on a dC/dX display unit 17.

A lock-in amplifier 18 detects a $d^2C/dVdX$ signal from the signal dC/dX of the lock-in amplifier 16 using the frequency $f_1$ of the AC voltage of the voltage modulation circuit 7 as a reference, while a 4 μm×4 μm predetermined area of the sample 1 is scanned by the scan circuit 11. Thus, a $d^2C/dVdX$ signal is stored in the memory of the computer 10 in relation to the relative location of the conductive probe 3 in the X- and Y-directions. As a result, a $d^2C/dVdX$ image of the sample 1 is obtained by the computer 10 on a $d^2C/dVdX$ display unit 19.

In FIG. 4, if the sample 1 is made of semiconductor, metal, insulator and the like, a C image displayed on the "C" display unit 13 shows the distribution of each of the semiconductor, metal, insulator and the like. Also, as stated above, a dC/dV image displayed on the dC/dV display unit 15 shows the polarity and concentration of dopants in the sample 1 which is made of monocrystalline silicon, for example. Further, a dC/dV image displayed on the dC/dX display unit 17 shows a distribution of an insulator or the like in the sample 1 which distribution is not dependent upon the dC/dV component of the capacitance between the conductive probe 3 and the sample 1. Note that, since a dC/dX image can be obtained without applying a voltage to the sample 1, a pn junction of a semiconductor substrate which is subject to a voltage applied thereto can be easily observed by the dC/dX image. Further, a $d^2C/dVdX$ image shows a spatial slop of a concentration of dopants in the sample 1.

Note that the above-mentioned images can be simultaneously obtained by one scanning operation of the conductive probe 3 upon the sample 1.

In FIG. 4, the $d^2C/dVdX$ signal is obtained by modulating the capacitance signal C of the capacitance sensor 8A in the frequency $f_0$ of the oscillator 5 and then detecting the demodulated signal by using the frequency $f_1$ of the AC voltage of the voltage modulation circuit 7, however, the $d^2C/dVdX$ signal can be obtained by modulating the capacitance signal C of the capacitance sensor 8A in the frequency $f_1$ of the AC voltage of the voltage modulation circuit 7 and then detecting the demodulated signal by using the frequency $f_0$ of the oscillator 5. In this case, the lock-in amplifier 16 is connected to a post stage of the lock-in amplifier 18.

Also, in FIG. 4, the output voltage Δ of the servo circuit 9 is applied to the piezoelectric element 2 to move the sample 1 in the Z-direction, so that the vibration amplitude of the conductive probe 3 or the difference in phase between the vibration frequency of the conductive probe 3 and the frequency $f_0$ of the oscillator 5 is brought close to the definite value $V_{REF}$. However, this feedback control operation can be carried out so that other electrical characteristic signal such as the "C" signal, the dC/dV signal, the dC/dX signal or the $d^2C/dVdX$ signal can be brought close to the definite value $V_{REF}$. In this case, the capacitance sensor 8A, the lock-in amplifier 14, the lock-in amplifier 16 or the lock-in amplifier 18 is connected to the servo circuit 9.

When the sample 1 is constructed by a monocrystalline silicon substrate 701 and a silicon oxide layer 702 formed thereon, as shown in FIG. 7, a concentration of majority carriers in equilibrium or a concentration of ionized dopants will be explained next.

In a metal-oxide-semiconductor (MOS) structure as illustrated in FIG. 7, a total capacitance $C_{total}$ is given by:

$$C_{total} = C_a C_o / (C_a + C_o) \quad (1)$$

where $C_s$ is a capacitance of a depletion region generated in the silicon substrate 701; and $C_o$ is a capacitance of the silicon oxide layer 702.

Therefore, $$dC_{total}/dV = C_o^2/(C_a+C_o)^2 \cdot (dC_s/dV) \quad (2)$$

Since $dC_n/dV$ is dependent upon the concentration of majority carriers in equilibrium or the concentration of dopants, the concentration of majority carriers in equilibrium or the concentration of dopants can be estimated from a measured value of $dC_{total}/dV$. However, since the formula (2) is complex and the capacitance $C_o$ of the silicon oxide layer 702 has to be obtained in advance, it is difficult to estimate the above-mentioned concentration from the formula (2).

The inventors have invented a technique for simply estimating the concentration of majority carriers in equilibrium or the concentration of dopants of the silicon substrate 701 of FIG. 7.

In FIG. 7, a voltage V applied to the silicon substrate 701 is divided as follows.

$$V = V_s + V_o \quad (3)$$

where $V_s$ is a voltage applied to the depletion region; and $V_o$ is a voltage applied to the silicon oxide layer 702.

Also, the capacitance $C_s$ is dependent upon the concentration $p_o$ of majority carriers in equilibrium and the voltage $V_a$, i.e., $$C_a = C_s(V_s, p_o) \quad (4)$$

Note that, if the silicon substrate 701 is of a p-type, $p_o$ designates a hole concentration in equilibrium.

If $C_o$ is definite, from formulae (1) and (4), $$\partial C_{total}/\partial V = (\partial C_a(V_s, p_o)/\partial V) \cdot C_o^2/(C_a(V_s, p_o)+C_o)^2 \quad (5)$$

$$\partial C_{total}/\partial X = (\partial C_a(V_s, p_o)/\partial X) \cdot C_o^2/(C_a(V_s, p_o)+C_o)^2 \quad (6)$$

In order to remove $C_o$ from formulae (5) and (6), $$(\partial C_{total}/\partial X)/(\partial C_{total}/\partial V) = (\partial C_s(V_s, p_o)/\partial X)/(\partial C_s(V_s, p_o)/\partial V) \quad (7)$$

Here, generally, $$C_s(V_s, p_o) = |\partial Q_s/\partial V_s| \quad (8)$$

$$Q_s = 2\epsilon_s\epsilon_o kT/eL_D \cdot ((e^{-eV_s/kT} + eV_s/kT - 1) + n_o/p_o(e^{eV_s/kT} - eV_s/kT - 1))^{1/2} \quad (9)$$

where $Q_s$ is a charge per unit surface area of the silicon substrate 701;

$\epsilon_a$ is a permittivity of the silicon substrate 701;

$\epsilon_0$ is a permittivity of free space;

k is Boltzmann constant;

T is an absolute temperature;

$L_D$ is a Debye length;

$n_o$ is a concentration of minority carriers such as electrons in equilibrium.

If the voltage V or $V_s$ is small so as not to generate an inversion region in the silicon substrate 701, $eV_a/kT \gg 1$ $n_o \ll p_o$ Therefore, from formulae (8) and (9), $$C_s(V_s, p_o) = (\epsilon_a\epsilon_o/L_D)(kT/e)^{1/2}V_s^{-1/2} = \epsilon_s\epsilon_o(2\epsilon_s\epsilon_o kT/p_o e^2)^{-1/2}(kT/e)^{1/2} 2V_s^{-1/2} \quad (10)$$

Also, the concentrations $p_o$ and $n_o$ in equilibrium are non-uniform along the X-direction, i.e., $$p_o = p_o(X) \quad (11)$$

$$n_o = n_o(X) \quad (12)$$

Therefore, from formulae (3), (7), (10), (11) and (12), $$(\partial C_s(V_s, p_o)/\partial X)/(\partial C_s(V_a, p_o)/\partial V) = (\partial C_s(V_s, X)/\partial X)/(\partial C_s(V_a, X)/\partial V_s) = -V_n p_o^{-1} dp_o/dX = -V_s d(\ln p_o(X))/dX \quad (13)$$

Figure 8A:
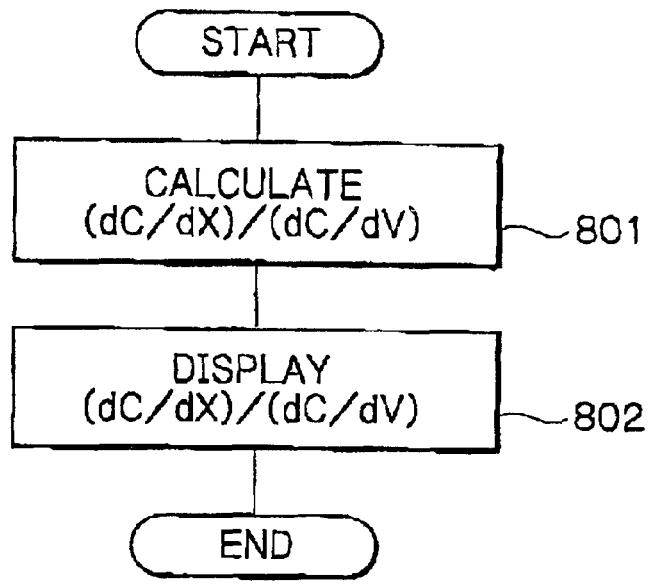
FIGS. 8A and 8B are flowcharts showing operations of the control unit of FIG. 4.
Figure 8B:
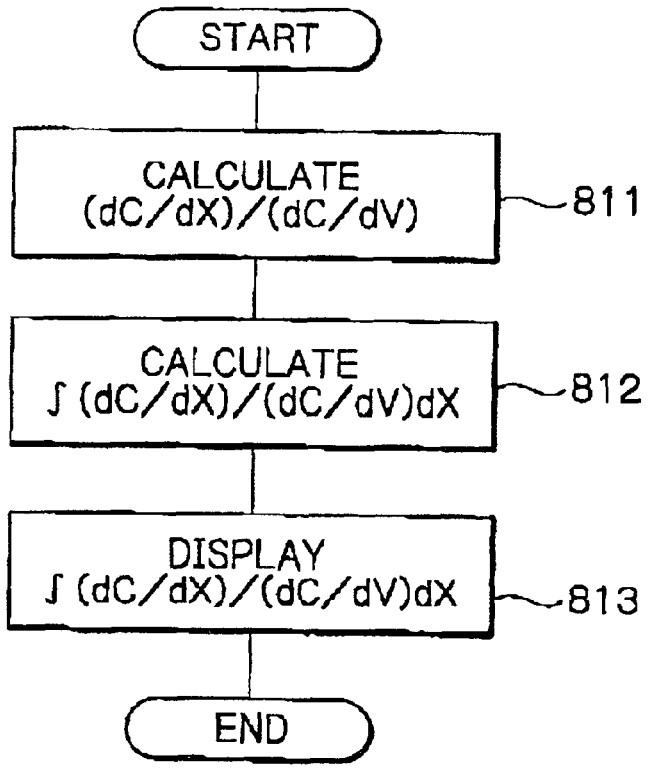

In the formula (13), $V_s$ is definite while the conductive probe 3 is scanning. Therefore, information regarding the slope of concentration $p_o$ of majority carriers in equilibrium with respect to the X-direction, i.e., information regarding $p_o^{-1} dp_o/dX$ can be displayed as (dC/dX)/(dC/dV) by the computer 10 using a flowchart as shown in FIG. 8A. Also, information regarding $\ln p_o(X)$ can be displayed as an integration value of (dC/dX)/(dC/dV) with respect to the coordinate X by the computer 10 using a flowchart as shown in FIG. 8B.

On the other hand, the voltage V or $V_a$ is large so as to generate an inversion region in the silicon substrate 701, $$C_a(V_s, X) = (e N_A(X)\epsilon_a\epsilon_o/2)^{1/2} V_a^{-} \quad (14)$$

where $N_A(X)$ is a concentration of ionized acceptor impurities. In this case, the formula (13) is rewritten as $$(\partial C_s(V_a, X)/\partial X)/(\partial C_s(V_s, X)/\partial V) = -V_a N_A^{-1} dN_A(X)/dX = -V_s d(\ln N_A(X))/dX \quad (15)$$

Even in the formula (15), $V_s$ is definite while the conductive probe 3 is scanning. Therefore, information regarding the slope of concentration $N_A(X)$ of ionized acceptor impurities with respect to the X-direction, i.e., information regarding $N_A^{-1}dN_A(X)/dX$ can be displayed as $(dC/dX)/(dC/dV)$ with respect to the coordinate X by the computer 10 using a flowchart as shown in FIG. 8A. Also, information $lnN_A(X)$ can be displayed by the computer 10 using a flowchart as shown in FIG. 8B.

Figure 9:
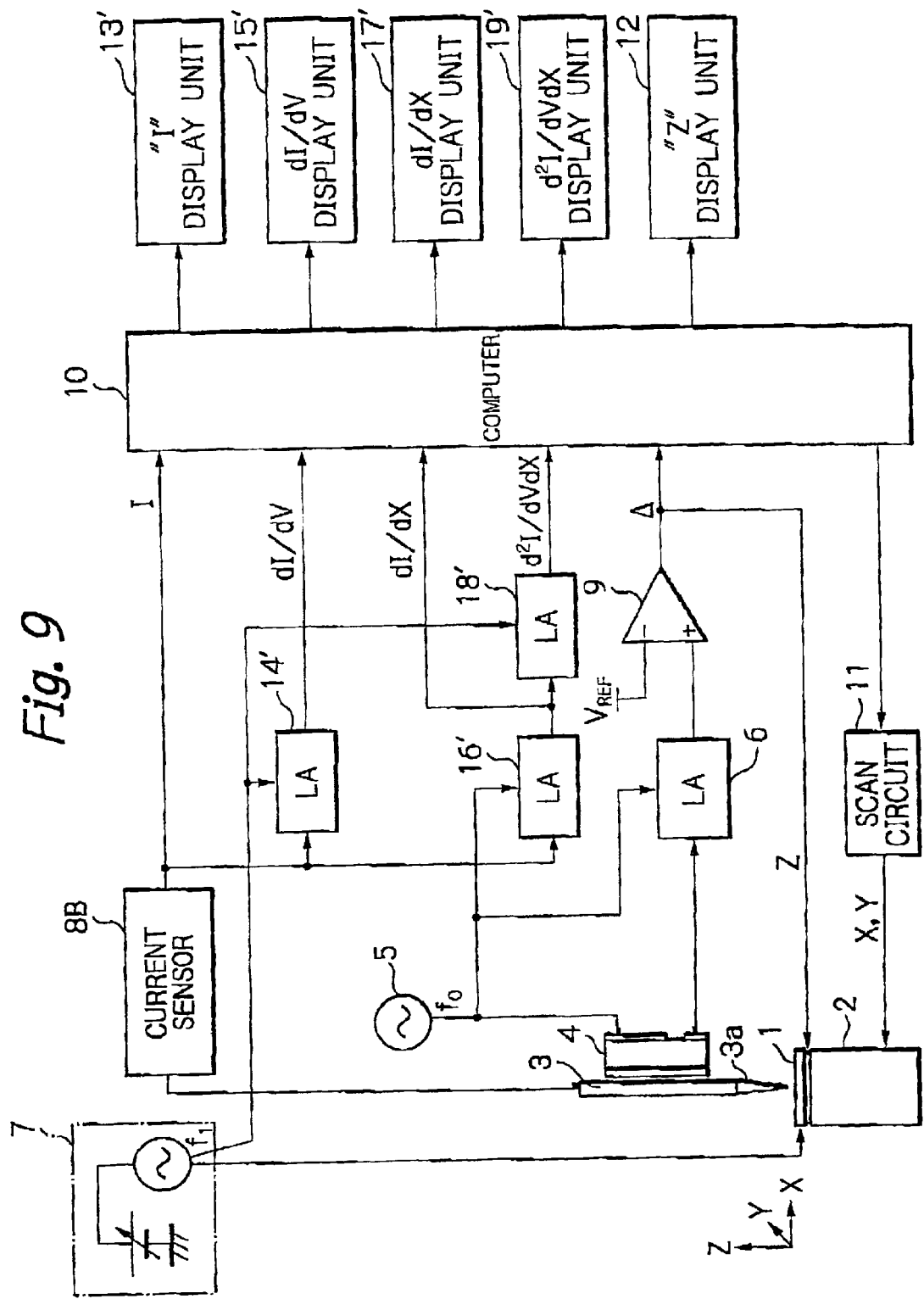
FIG. 9 is a block circuit diagram illustrating a second embodiment of the scanning probe microscope according to the present invention.

In FIG. 9, which illustrates a second embodiment of the scanning probe microscope according to the present invention, a current sensor 8B serves as the sensor 8 of FIG. 3.

In FIG. 9, the piezoelectric element 4 vibrates the conductive probe 3, and simultaneously, the piezoelectric element 4 generates a current signal due to the piezoelectric effect of the piezoelectric element 4 caused by the vibration of the conductive probe 3. A lock-in amplifier serving as the detector 6 of FIG. 3 detects the vibration amplitude of the conductive probe 3 or the difference in phase between the vibration frequency of the conductive probe 3 and the frequency $f_0$ of the oscillator 5 using the frequency $f_0$ of the oscillator 5 as a reference. Then, the output voltage of the lock-in amplifier 6 is supplied to an input of a servo circuit 9 which generates an output voltage Δ and transmits it to the piezoelectric element 2. Note that the servo circuit 9 serves as the feedback control unit of FIG. 3. As a result, the location Z of the sample 1 is controlled by using the output voltage Δ of the servo circuit 9, so that the vibration amplitude of the conductive probe 3 or the difference in phase between the vibration frequency of the conductive probe 3 and the frequency $f_0$ of the oscillator 5 is brought close to a reference voltage $V_{REF}$. Thus, the distance between the sharp edge 3a of the conductive probe 3 and the sample 1 is brought close to a definite value.

In FIG. 9, since the vibration state of the conductive probe 3 is detected by the piezoelectric element 4, an optical system formed by the laser diode 106 and the detector 107 of FIG. 1 is unnecessary, and also, the sample 1, the conductive probe 3 and the like can be easily incorporated into a small vacuum chamber or cryostat.

Also, a computer 10 is provided for controlling the entire scanning probe microscope of FIG. 4, and a scan circuit 11 is connected between the computer 10 and the piezoelectric element 2 to move the sample 1 along the X- and Y-directions. As a result, the conductive probe 3 scans the sample 1 while the distance between the conductive probe 3 and the sample 1 is maintained at a definite value. In this case, the computer 10 stores the location Z of the sample 1 corresponding to the output voltage Δ of the servo circuit 9 in relation to the location of the conductive probe 3 in the X- and Y-directions in a memory thereof. For example, the scan circuit 11 is operated so that a 4 μm×4 μm area of the sample 1 is scanned by the conductive probe 3. Thus, a topographical image of the sample 1 using the location Z is obtained by the computer 10 on a "Z" display unit 12 as shown in FIG. 6A.

The current sensor 8B generates a current signal I relating to a current flowing through between the conductive probe 3 and the sample 1. Thus, the current signal I is stored in the memory of the computer 10 in relation to the relative location of the conductive probe 3 in the X- and Y-directions. As a result, the current flowing through the sample 1 using the current signal I is obtained by the computer 10 on the "I" display unit 13.

A lock-in amplifier 14' detects a dI/dV signal from the current signal I of the current sensor 8B using the frequency $f_1$ of the AC voltage of the voltage modulation circuit 7 as a reference, while a 4 μm×4 μm predetermined area of the sample 1 is scanned by the conductive probe 3 using the scan circuit 11. Thus, the dI/dV signal is stored in the memory of the computer 10 in relation to the relative location of the conductive probe 3 in the X- and Y-directions. As a result, a dI/dV image of the sample 1 is obtained by the computer 10 on a dI/dV display unit 15.

As shown in FIG. 9, the current signal I of the current sensor 8B is modulated by the vibration frequency of the conductive probe 3. Therefore, a lock-in amplifier 16' is provided to detect a dI/dX signal from the current signal I of the current sensor 8B using the frequency $f_0$ of the oscillator 5 as a reference, while a 4 μm×4 μm predetermined area of the sample 1 is scanned by the scan circuit 11. In this case, the dI/dX signal indicates a spatial differential component of the current I with respect to a coordinate X for showing the vibration direction of the conductive probe 3. Thus, the dI/dX signal is stored in the memory of the computer 10 in relation to the relative location of the conductive probe 3 in the X- and Y-directions. As a result, a dI/dX image of the sample 1 is obtained by the computer 10 on a dI/dX display unit 17'.

A lock-in amplifier 18' detects a $d^2I/dVdX$ signal from the signal dI/dX of the lock-in amplifier 16' using the frequency $f_1$ of the AC voltage of the voltage modulation circuit 7 as a reference, while a 4 μm×4 μm predetermined area of the sample 1 is scanned by the scan circuit 11. Thus, a $d^2I/dVdX$ signal is stored in the memory of the computer 10 in relation to the relative location of the conductive probe 3 in the X- and Y-directions. As a result, a $d^2I/dVdX$ image of the sample 1 is obtained by the computer 10 on a $d^2I/dVdX$ display unit 19.

In FIG. 4, if the sample 1 is made of semiconductor, metal, insulator and the like, an I image displayed on the "I" display unit 13' shows the distribution of each of the semiconductor, metal, insulator and the like. Also, a dI/dV image displayed on the dI/dV display unit 15' shows the distribution of in the sample 1. Further, a dI/dX image displayed on the dI/dX display unit 17' shows boundaries of different electrical characteristics in the sample 1. Further, a $d^2I/dVdX$ image shows a spatial slope of conductivity in the sample 1.

Note that the above-mentioned images can be simultaneously obtained by one scanning operation of the conductive probe 3 upon the sample 1.

In FIG. 9, the $d^2I/dVdX$ signal is obtained by modulating the capacitance signal I of the current sensor 8B in the frequency $f_0$ of the oscillator 5 and then detecting the demodulated signal by using the frequency $f_1$ of the AC voltage of the voltage modulation circuit 7, however, the $d^2I/dVdX$ signal can be obtained by modulating the current signal I of the current sensor 8B in the frequency $f_1$ of the AC voltage of the voltage modulation circuit 7 and then detecting the demodulated signal by using the frequency $f_0$ of the oscillator 5. In this case, the lock-in amplifier 16' is connected to a post stage of the lock-in amplifier 18'.

Also, in FIG. 9, the output voltage Δ of the servo circuit 9 is applied to the piezoelectric element 2 to move the sample 1 in the Z-direction, so that the vibration amplitude of the conductive probe 3 or the difference in phase between the vibration frequency of the conductive probe 3 and the frequency $f_0$ of the oscillator 5 is brought close to the definite value $V_{REF}$. However, this feedback control operation can be carried out so that other electrical characteristic signal such as the "I" signal, the dI/dV signal, the dI/dX signal or the $d^2I/dVdX$ signal can be brought close to the definits value $V_{REF}$. In this case, the current sensor 8B, the lock-in amplifier 14', the lock-in amplifier 16' or the lock-in amplifier 18' is connected to the servo circuit 9.

Figure 10:
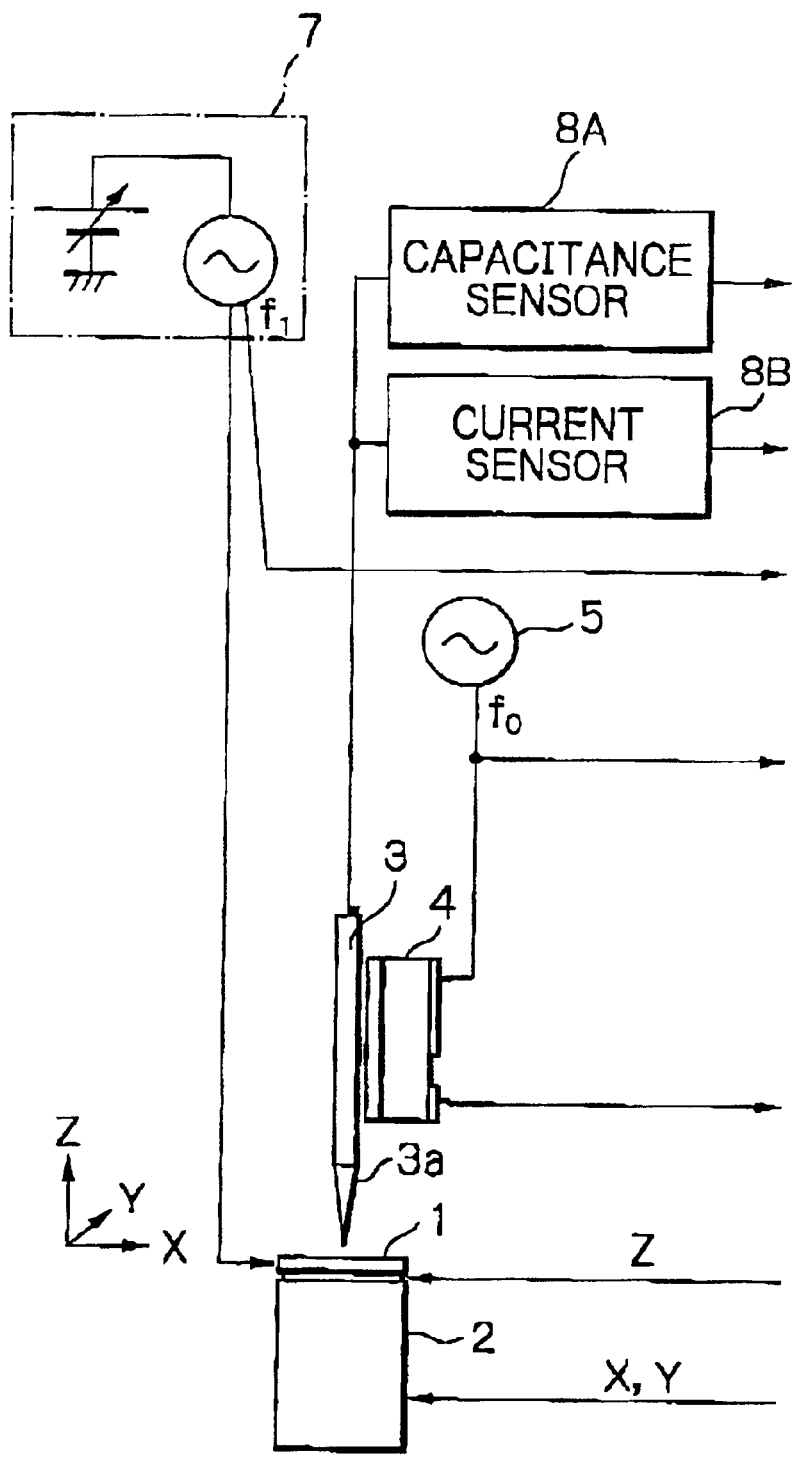
FIG. 10 is a block circuit diagram illustrating a third embodiment of the scanning probe microscope according to the present invention.

In FIG. 10, which illustrates a third embodiment of the present invention, the scanning probe microscope of FIG. 4 is combined with that of FIG. 9, i.e., the capacitance sensor 8A and the current sensor 8B are both provided and are connected in parallel. As a result, a topographical image, a capacitance image, a dC/dV image, a dC/dX image, a $d^2C/dVdX$ and a (dC/dX)/(dC/dV) image as well as a current image, a dI/dV image, a dI/dX image and a $d^2I/dV/dX$ image can be obtained.

In the above-described embodiments, the conductive probe 3 is made of metal, the conductive probe 3 can be made of silicon into which dopants are highly doped. In this case, the microscope can detect a change of the Q-value of the vibration of the conductive probe 3 due to the electrical interaction between the conductive probe 3 and the sample 1. Also, the above-mentioned images obtained by changing the temperature of the conductive probe 3 and the sample 1.

As explained hereinabove, according to the present invention, since the conductive probe has a low impedance, the sensitivity of the sensor is substantially decreased. Also, since the conductive probe has a small surface against the sample, the S/N ratio of the sensor signal is not deteriorated. Further, since the radius of curvature of the sharp end of the conductive probe is small, the spatial resolution can be increased. In addition, since the conductive probe associated with its sharp edge is formed by a single material, the sharp edge is hardly peeled off from the conductive probe by the friction between the sharp edge and the sample.

Further, since Joule heat is immediately transferred to the conductive probe, the sharp edge thereof is hardly dissolved, and thus, the conductivity of the conductive probe is not decreased.

Additionally, for the sample and the conductive probe can be easily accommodated in a small vacuum chamber or cryostat.

Also, in a scanning probe microscope according to the present invention, the conductive probe is vibrated in parallel with the surface of a sample at a frequency $f_0$ and a detection system such as a capacitance sensor or a current sensor is connected to the conductive probe. Then, the output signal of the detection system is detected by using the frequency $f_0$ or the like, various kinds of images showing the electrical characteristics of the sample can be obtained.

Further, if the sample is formed by a semiconductor device information regarding the concentration of majority carriers in equilibrium and the concentration of ionized dopants can be easily obtained.

What is claimed is:

1. A scanning probe microscope for a sample, comprising:
   a probe having a body and a sharp end, said body and said sharp end including a single conductive material;
   a single piezoelectric element, electrically isolated from said body and in the proximity thereof, that is structured and arranged so as to vibrate said sharp end along a direction approximately in parallel with a surface of said sample; and
   a detector, coupled to said single piezoelectric element, said detector being structured and arranged so as to detect a vibration state of said probe in response to a difference in phase between a vibration frequency of said single piezoelectric element and a frequency of said probe.

2. The scanning probe microscope as set forth in claim 1, wherein said single conductive material comprises one of W, Pt/Ir, Ni, Au and Ag.

3. The scanning probe microscope as set forth in claim 1, wherein said single conductive material comprises a wire.

4. The scanning probe microscope as set forth in claim 1, wherein said probe is vibrated at a resonance frequency of said probe.

5. The scanning probe microscope as set forth in claim 1, wherein said probe is vibrated at a resonance frequency of said piezoelectric element.

6. A The scanning probe microscope as set forth in claim 1, further comprising a feedback control unit, connected to said detector, for performing a feedback control operation upon a distance between said the sharp end of said probe and said sample in accordance with the detected vibration state of said detector, so that the detected vibration state is brought close to a predetermined definite value.

7. A scanning probe microscope for a sample, comprising:
   a probe having a conductive sharp end;
   a moving unit for moving said sample along a Z-direction and moving said sample in X- and Y-directions;
   a single vibrating unit electrically isolated from said probe and in the proximity thereof, structured and arranged so as to vibrate said probe along a direction approximately in parallel with a surface of said sample;
   a vibration detecting unit structured and arranged so as to detect a vibration state of said probe in response to a difference in phase between a vibration frequency of said single vibrating unit and a frequency of said probe;
   a signal detecting unit for detecting an electrical characteristic signal between said probe and said sample;
   a control unit for controlling an interaction between said probe and said sample so that the interaction is brought close to a predetermined definite level; and
   a voltage applying unit for applying an AC voltage to said sample.

8. The scanning probe microscope as set forth in claim 7, wherein said control unit comprises a feedback control unit for adjusting a distance between the sharp and of said probe and said sample so that the detected vibration state of said probe is brought close to a predetermined definite level.

9. The scanning probe microscope as set forth in claim 7, wherein the detected vibration state of said probe is one of a resonance amplitude and a resonance frequency of said probe.

10. The scanning probe microscope as set forth in claim 7, wherein the detected vibration state of said probe is one of a resonance amplitude and a resonance frequency of said vibrating unit.

11. The scanning probe microscope as set forth in claim 7, wherein the detected vibration state of said probe is a signal relating to a Q-vaLue of vibration of said probe.

12. The scanning probe microscope as set forth in claim 7, wherein said control unit comprises a feedback control unit for adjusting a distance between the sharp and of said probe and said sample so that the detected electrical characteristic signal is brought close to a predetermined definite level.

13. The scanning probe microscope as set forth in claim 7, wherein said signal detecting unit comprises;
   a detector for detecting a signal from said probe;
   a diode detector, connected to said detector, for detecting an output signal of said detector; and
   a frequency detector, connected to said diode detector, for detecting an output signal of said diode detector by using a frequency close to a vibration frequency of said probe as a reference.

14. The scanning probe microscope as set forth in claim 7, wherein said signal detecting unit comprises;

a detector for detecting a signal from said probe;

a diode detector, connected to said detector, for detecting an output signal of said detector; and a frequency detector, connected to said diode detector, for detecting an output signal of said diode detector by using a frequency close to a frequency of said AC voltage as a reference.

15. The scanning probe microscope as set forth in claim 7, wherein said signal detecting unit comprises;

a detector for detecting a signal from said probe;

a diode detector, connected to said detector, for detecting an output signal of said detector;

a first frequency detector, connected to said diode detector, for detecting an output signal of said diode detector by using a frequency close to a frequency of said AC voltage as a reference; and a second frequency detector, connected to said diode detector, for detecting an output signal of said diode detector by using a frequency close to a frequency of said AC voltage as a reference.

16. The scanning probe microscope as set forth in claim 7, wherein said electrical characteristic signal shows a capacitance between said probe and said sample.

17. The scanning probe microscope as set forth in claim 7, wherein said electrical characteristic signal shows a differential component of a capacitance between said probe and said sample with respect to said AC voltage.

18. The scanning probe microscope as set forth in claim 7, wherein said electrical characteristic signal shows a differential component of a capacitance between said probe and said sample with respect to a vibration coordinate of said probe.

19. The scanning probe microscope as set forth in claim 7, wherein said electrical characteristic signal shows a second-order differential component of a capacitance between said probe and said sample with respect to said AC voltage and a vibration coordinate of said probe.

20. The scanning probe microscope as set forth in claim 7, wherein said electrical characteristic signal shows a current flowing through said probe and said sample.

21. The scanning probe microscope as set forth in claim 7, wherein said electrical characteristic signal shows a differential component of a current flowing through said probe and said sample with respect to said AC voltage.

22. The scanning probe microscope as set forth in claim 7, wherein said electrical characteristic signal shows a differential component of a current flowing through said probe and said sample with respect to a vibration coordinate of said probe.

23. The scanning probe microscope as set forth in claim 7, wherein said electrical characteristic signal shows a second-order differential component of a current flowing through said probe and said sample with respect to said AC voltage and a vibration coordinate of said probe.

24. The scanning probe microscope as set forth in claim 7, wherein said electrical characteristic signal is detected under a condition that said probe and said sample are incorporated into a vacuum chamber.

25. The scanning probe microscope as set forth in claim 7, wherein said electrical characteristic signal is detected under a condition that a temperature of said probe and said sample is being changed.

26. The scanning probe microscope as set forth in claim 8, further comprising a display unit for displaying a surface information of said sample in accordance with the adjusted distance.

27. The scanning probe microscope as set forth in claim 12, further comprising a display unit for displaying the detected electrical characteristic signal.

28. The scanning probe microscope as set forth in claim 7, wherein a frequency of said AC voltage is higher than a frequency of the vibration state of said probe.

29. A method for controlling a scanning probe microscope for a sample, comprising: a probe having a conductive sharp end; a moving unit for moving said sample along a Z-direction and moving said sample in X- and Y-directions; a single vibrating unit structured and arranged so as to vibrate said probe along a direction approximately in parallel with a surface of said sample; a vibration detecting unit structured and arranged so as to detect a vibration state of said probe in response to a difference in phase between a vibration frequency of said single vibrating unit and a frequency of said probe; a signal detecting unit for detecting an electrical characteristic signal between said probe and said sample; a control unit for controlling an interaction between said probe and said sample so that the interaction is brought close to a predetermined definite level; and a voltage applying unit for applying an AC voltage to said sample, said method comprising:

electrically isolating the probe from the single vibrating unit; and adjusting a distance between the sharp end of said probe and said sample so that the detected vibration state of said probe is brought close to a predetermined definite level.

30. A method for controlling a scanning probe microscope for a sample, comprising: a probe having a conductive sharp end; a moving unit for moving said sample along a Z-direction and moving said sample in X- and Y-directions; a single vibrating unit structured and arranged to vibrate said probe along a direction approximately in parallel with a surface of said sample; a vibration detecting unit structured and arranged to detect a vibration state of said probe in response to a difference in phase between a vibration frequency of said single vibrating unit and a frequency of said probe; a signal detecting unit for detecting an electrical characteristic signal between said probe and said sample; a control unit for controlling an interaction between said probe and said sample so that the interaction is brought close to a predetermined definite level; and a voltage applying unit for applying an AC voltage to said sample, said method comprising:

electrically isolating the probe from the single vibrating unit; and adjusting a distance between the sharp end of said probe and said sample so that the detected electrical characteristic signal is brought close to a predetermined definite level.

31. The method as set forth in claim 30, further comprising the steps of:

detecting a signal from said probe by a detector diode-detecting an output signal of said detector by a diode; and detecting an output signal of said diode by using a frequency close to a vibration frequency of said probe as a reference.

32. The method as set forth in claim 30, further comprising the steps of:

detecting a signal from said probe by a detector;

detecting an output signal of said detector by a diode; and detecting an output signal of said diode by using a frequency close to a frequency of an AC component of said AC/DC voltage as a reference.

33. The method as set forth in claim 30, further comprising the steps of:
   detecting a signal from said probe by a detector;
   detecting an output signal of said detector by a diode; and
   detecting an output signal of said diode by using a frequency close to a frequency of said AC voltage as a reference and by using a frequency close to a vibration frequency of said probe as a reference.

34. The method as set forth in claim 30, wherein said electrical characteristic signal is detected under a condition that said probe and said sample are incorporated into a vacuum chamber.

35. The method as set forth in claim 30, wherein said electrical characteristic signal is detected under a condition that a temperature of said probe and said sample is being changed.

36. The method as set forth in claim 29, wherein a frequency of the vibration state of said probe is lower than a frequency of said AC voltage.

37. The method as set forth in claim 30, wherein a frequency of the vibration state of said probe is lower than a frequency of an AC component of said AC/DC voltage.

38. A scanning probe microscope for a sample, comprising:
   a moving unit for moving said sample in X-, Y- and Z-directions;
   a conductive probe approximately perpendicular to a surface of said sample and having a sharp end capable of being in proximity to the surface of said sample;
   an oscillator;
   a single vibrating unit, connected to said oscillator and electrically isolated from said conductive probe, said single vibrating unit being structured and arranged to vibrate said conductive probe in the X-direction in accordance with a frequency of said oscillator;
   a vibration detecting unit structured and arranged to detect a vibration amplitude of said conductive probe to generate a vibration voltage in response to a difference in phase between a vibration frequency of said single vibrating unit and a frequency of said probe;
   a feedback control unit, connected between said vibration detecting unit and said moving unit, for controlling a location of said sample in the Z-direction in accordance with the detected vibration amplitude of said vibration detecting unit, so that the vibration amplitude of said vibrating detecting unit is brought close to a predetermined definite value;
   an AC voltage modulation circuit, connected to said sample, for supplying an AC modulation voltage to said sample; and
   a sensor, connected to said conductive probe, for detecting an electrical characteristic signal showing a state of said sample immediately below the sharp end of said conductive probe.

39. The scanning probe microscope as set forth in claim 38, wherein said sensor comprises a capacitance sensor.

40. The scanning probe microscope as set forth in claim 39, further comprising a second display unit for displaying a capacitance signal of said capacitance sensor while a predetermined area of said sample in the X- and Y-directions is scanned by said conductive probe using said moving unit.

41. The scanning probe microscope as set forth in claim 39, further comprising a second lock-in amplifier, connected to said capacitance sensor, for detecting a differential component of a capacitance signal of said capacitance sensor with respect to said AC modulation voltage using a frequency thereof as a reference.

42. The scanning probe microscope as set forth in claim 41, further comprising a third display unit for displaying the differential component of the capacitance signal of said capacitance sensor with respect to said AC modulation voltage while a predetermined area of said sample in the X- and Y-directions is scanned by said conductive probe using said moving unit.

43. The scanning probe microscope as set forth in claim 39, further comprising a third lock-in amplifier, connected to said capacitance sensor, for detecting a differential component of a capacitance signal of said capacitance sensor with respect to a vibration direction of said conductive probe using a frequency of said oscillator as a reference.

44. The scanning probe microscope as set forth in claim 43, further comprising a fourth display unit for displaying the differential component of the capacitance signal of said capacitance sensor with respect to the vibration direction of said conductive probe while a predetermined area of said sample in the X- and Y-directions is scanned by said conductive probe using said moving unit.

45. The scanning probe microscope as set forth in claim 43, further comprising a fourth lock-in amplifier, connected to said third lock-in amplifier, for detecting a second-order differential component of the capacitance signal of said capacitance sensor with respect to the vibration direction of said conductive probe and said AC voltage by said AC modulation voltage using a frequency thereof as a reference.

46. The scanning probe microscope as set forth in claim 45, further comprising a fifth display unit for displaying the second-order differential component of the capacitance signal of said capacitance sensor while a predetermined area of said sample in the X- and Y-directions is scanned by said conductive probe using said moving unit.

47. The scanning probe microscope as set forth in claim 39, further comprising:
   a second lock-in amplifier, connected to said capacitance sensor, for detecting a first differential component of a capacitance signal of said capacitance sensor with respect to said AC modulation voltage using a frequency thereof as a reference;
   a third lock-in amplifier, connected to said capacitance sensor, for detecting a second differential component of a capacitance signal of said capacitance sensor with respect to a vibration direction of said conductive probe using a frequency of said oscillator as a reference;
   a computer, connected to said first and second lock-in amplifiers, for calculating a ratio of said second differential component to said first differential component; and
   a sixth display unit for displaying information relating to said ratio while a predetermined area of said sample in the X- and Y-directions is scanned by said conductive probe using said moving unit.

48. The scanning probe microscope as set forth in claim 39, further comprising:
   a second lock-in amplifier, connected to said capacitance sensor, for detecting a first differential component of a capacitance signal of said capacitance sensor with respect to said AC modulation voltage using a frequency thereof as a reference;
   a third lock-in amplifier, connected to said capacitance sensor, for detecting a second differential component of a capacitance signal of said capacitance sensor with respect to a vibration direction of said conductive probe using a frequency of said oscillator as a reference;

a computer, connected to second and third lock-in amplifiers, for calculating a ratio of said second differential component to said first differential component and calculating an integration value of said ratio in the X-direction, a sixth display unit for displaying said integration value while a predetermined area of said sample in the X- and Y-directions is scanned by said conductive probe using said moving unit.

49. The scanning probe microscope as set forth in claim 38, wherein said sensor comprises a current sensor.

50. The scanning probe microscope as set forth in claim 49, further comprising a sixth display unit for displaying a current signal of said current sensor while a predetermined area of said sample in the X- and Y-directions is scanned by said conductive probe using said moving unit.

51. The scanning probe microscope as set forth in claim 49, further comprising a fifth lock-in amplifier, connected to said current sensor, for detecting a differential component of a current signal of said current sensor with respect to a voltage of said AC modulation voltage using a frequency thereof as a reference.

52. The scanning probe microscope as set forth in claim 51, further comprising an eighth display unit for displaying the differential component of the current signal of said current sensor with respect to said AC modulation voltage while a predetermined area of said sample in the X- and Y-directions is scanned by said conductive probe using said moving unit.

53. The scanning probe microscope as set forth in claim 49, further comprising a sixth lock-in amplifier, connected to said current sensor, for detecting a differential component of a current signal of said current sensor with respect to a vibration direction of said conductive probe using a frequency of said oscillator as a reference.

54. The scanning probe microscope as set forth in claim 53, further comprising a ninth display unit for displaying the differential component of the current signal of said current sensor with respect to the vibration direction of said conductive probe while a predetermined area of said sample in the X- and Y-directions is scanned by said conductive probe using said moving unit.

55. The scanning probe microscope as set forth in claim 53, further comprising a seventh lock-in amplifier, connected to said sixth lock-in amplifier, for detecting a second-order differential component of the current signal of said current sensor with respect to the vibration direction of said conductive probe and said AC voltage by a frequency of said oscillator as a reference and said AC modulation voltage using a frequency thereof as a reference.

56. The scanning probe microscope as set forth in claim 55, further comprising a tenth display unit for displaying the second-order differential component of the current signal of said current sensor while a predetermined area of said sample in the X- and Y-directions is scanned by said conductive probe using said moving unit.

57. The scanning probe microscope as set forth in claim 38, wherein a frequency of said AC modulation voltage is higher than a frequency of the vibrating unit.

58. The scanning probe microscope as set forth in claim 47, wherein said ratio shows information regarding a slope of a concentration of majority carriers in equilibrium with respect to said vibration direction when said AC modulation voltage is small so as not to generate an inversion region in said sample.

59. The scanning probe microscope as set forth in claim 47, wherein said ratio shows information regarding a slope of a concentration of ionized dopants with respect to said vibration direction when said AC modulation voltage is large so as to generate an inversion region in said sample.

60. The scanning probe microscope as set forth in claim 48, wherein said integration value shows information regarding a logarithmic value of a concentration of majority carriers in equilibrium with respect to said vibration direction when said voltage is small so as not to generate an inversion region in said sample.

61. The scanning probe microscope as set forth in claim 48, wherein said integration shows information regarding a logarithmic value of a concentration of ionized dopants with respect to said vibration direction when said voltage is large so as to generate an inversion region in said sample.

\* \* \* \* \*